United States Patent
Gros et al.

(10) Patent No.: US 9,962,940 B2
(45) Date of Patent: *May 8, 2018

(54) MANAGING A SERVICE CARTRIDGE (71) Applicant: HEWLETT-PACKARD DEVELOPMENT COMPANY, L.P., Houston, TX (US)

(72) Inventors: Xavier Gros, Barcelona (ES); Gloria Hernandez Ballester, Polinya (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/416,580

(22) Filed: Jan. 26, 2017

(65) Prior Publication Data
US 2017/0136772 A1 May 18, 2017

Related U.S. Application Data (63) Continuation of application No. 15/030,250, filed as application No. PCT/EP2013/071995 on Oct. 21, 2013, now Pat. No. 9,592,671.

(51) Int. Cl.
*B41J 2/165* (2006.01)

(52) U.S. Cl.
CPC ....... *B41J 2/16535* (2013.01); *B41J 2/16517* (2013.01); *B41J 2/16526* (2013.01); *B41J 2002/1655* (2013.01); *B41J 2002/16573* (2013.01)

(58) Field of Classification Search
CPC ............................................... B41J 2002/1655
See application file for complete search history.

(56) References Cited

U.S. PATENT DOCUMENTS

| 5,266,975 | A | 11/1993 | Mochizuki et al. |
| 5,764,253 | A | 6/1998 | Uchikata et al. |
| 6,357,854 | B1 | 3/2002 | Igval et al. |
| 9,592,671 | B2 * | 3/2017 | Gros .................... B41J 2/16535 |

(Continued)

FOREIGN PATENT DOCUMENTS

| JP | 08323999 | 12/1996 |
| JP | 2000141703 | 5/2000 |

OTHER PUBLICATIONS

PCT Search Report and Written Opinion, dated Jul. 8, 2014, PCT/EP2013/071995, Hewlett-Packard Development Company, Ltd., European Patent Office, 9 pages.

(Continued)

*Primary Examiner* — Shelby Fidler
(74) *Attorney, Agent, or Firm* — HP Inc. Patent Department (57) ABSTRACT

In some examples, a service cartridge includes a fluid storage container for receiving fluid discharged from a fluid ejection device, and a web wipe for performing a wiping operation on the fluid ejection device. In a first wiping operation, the web wipe is caused to be advanced by a first length. An amount of discharged fluid into the fluid storage container is monitored. In a second wiping operation after the first wiping operation, in response to the monitored amount of discharged fluid into the fluid storage container, the web wipe is caused to be advanced by a second length different from the first length.

20 Claims, 4 Drawing Sheets

(56) References Cited

U.S. PATENT DOCUMENTS

| | | | |
|---|---|---|---|
| 2003/0142150 A1* | 7/2003 | Barton | B41J 2/16508 347/2 |
| 2005/0018000 A1 | 1/2005 | Ishihara | |
| 2006/0164458 A1 | 7/2006 | Saikawa | |
| 2008/0252685 A1 | 10/2008 | Gomez et al. | |
| 2012/0176438 A1 | 7/2012 | Suzuki et al. | |
| 2013/0257977 A1 | 10/2013 | Tomida et al. | |
| 2013/0257978 A1 | 10/2013 | Danzuka et al. | |
| 2013/0257979 A1* | 10/2013 | Adachi | B41J 2/16535 347/33 |
| 2013/0257980 A1 | 10/2013 | Ibe | |
| 2014/0035996 A1 | 2/2014 | Gros Gras | |

OTHER PUBLICATIONS

UFOSystem 3800 Refillable Cartridge Installation, (Research Paper), Aug. 2009 (21 pages).

\* cited by examiner

MANAGING A SERVICE CARTRIDGE

CROSS-REFERENCE TO RELATED APPLICATION

This is a continuation of U.S. application Ser. No. 15/030,250, filed Apr. 18, 2016, U.S. Pat. No. 9,592,671, which is a national stage application under 35 U.S.C. § 371 of PCT/EP2013/071995, filed Oct. 21, 2013, which are both hereby incorporated by reference in their entirety.

BACKGROUND

Some printing systems have a service cartridge that comprises several different types of functional areas or units, including e.g. a web wipe, which is a web of wiping material to wipe the lower surface of the printhead, and a spittoon unit on which the printhead may spit drops of printing fluid, such as ink. The printing fluid spat by the printheads, together with that discharged in priming operations, is collected in a printing fluid storage container which takes up a portion of the volume of the service cartridge.

When one of the functional units of the cartridge becomes exhausted the service cartridge should be discarded or recycled, and replaced with a fresh one. In some cases the web wipe may be consumed before the printing fluid storage container is full, and it may be used as an indicator of the overall life of the cartridge. The web wipe consumption may be tracked to determine when the cartridge needs to be replaced.

BRIEF DESCRIPTION

Some non-limiting examples of methods of managing a service cartridge will be described in the following with reference to the appended drawings, in which.

DETAILED DESCRIPTION

Figure 1:
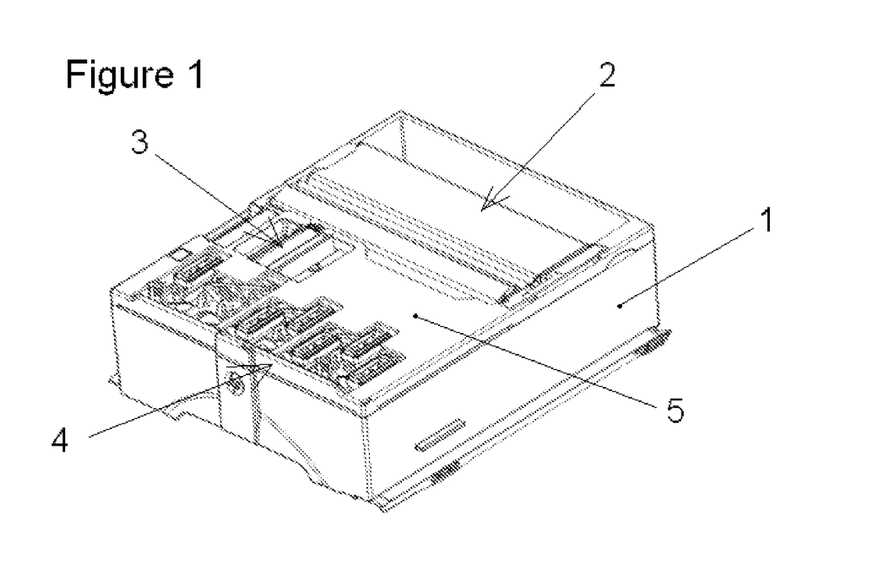
FIG. 1 schematically shows in perspective view an example of a service cartridge that may be managed by examples of methods as provided herein.

As shown in FIG. 1, a maintenance or service cartridge may comprise a housing 1 for receiving, in a first compartment thereof, a web wipe assembly 2, and, in a second compartment, a printing fluid spitting assembly 3, which is in communication with the interior of the housing, and a printhead capping assembly 4, both attached to a cover 5 of the compartment.

Figure 2:
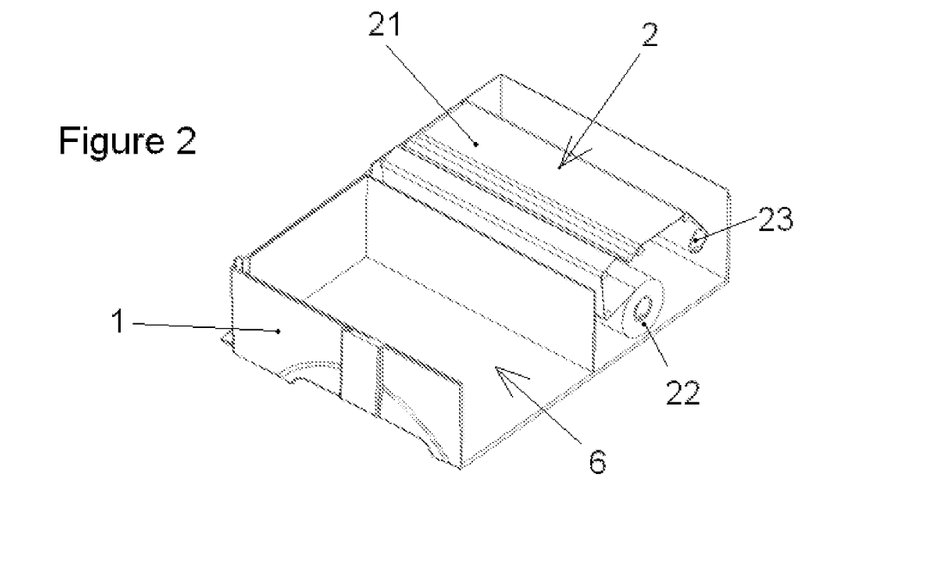
FIG. 2 schematically shows in partial perspective view a service cartridge such as that of FIG. 1 with the upper cover and some elements removed to show the interior.

FIG. 2 shows partially a cartridge such as that of FIG. 1, wherein the cover 5 of the second compartment has been removed, together with the spitting and capping assemblies 3 and 4.

As seen in FIG. 2, the web wipe assembly 2 may comprise a web wipe 21 made of flexible wiping material, such as cotton fabric, woollen, synthetic felt, nylon, etc., which may be wound on a supply spool 22, routed and supported under suitable tension along a defined pathway, and wound at its other end on a take-up spool 23 to collect the used portion of the web wipe.

A web wipe drive (not shown) may rotate the take-up spool 23, under the control of a controller, to draw a standard or predetermined length $PL_{AW}$ of fresh web wipe 21 from the supply spool 22 and perform a wiping operation on a printhead exterior surface.

The web wipe 21 may be provided with an indicator (not shown) of the amount thereof that has already been advanced towards the take-up spool 23, and therefore consumed. Such an indicator may for example comprise lines (not shown) extending obliquely all the length of the web wipe, in such a way that their position across the web wipe is different for each point of the length, and may be detected by a sensor above the cartridge, to determine the lengthwise position of the web wipe. Such a sensor may be on a printhead carriage of the printing system.

FIG. 2 also shows a printing fluid storage container 6 which occupies the second compartment of the housing 1. Printing fluid that is spat or is ejected during priming into the spitting assembly 3 is collected and accumulated in container 6.

As explained above, in some cases the web wipe 21 may become fully consumed before the container 6 is full of fluid. Therefore, the advance or consumption of the web wipe 21 may be monitored and the service cartridge may be replaced when the web wipe 21 is exhausted.

However, if during the life of the service cartridge the printing system is often operated in some specific working modes wherein, for example, the printheads spit or eject more fluid than usual, or less wiping operations are carried out, then the printing fluid may fill the storage container 6 before the web wipe 21 is exhausted, and therefore before the service cartridge is replaced.

In such cases, there may be a risk that the printing fluid overflows from the container 6 before the cartridge is replaced.

In order to reduce this risk and to have higher security, the length of the web wipe 21 in the cartridge could be reduced, or the length that the web wipe 21 is advanced at each wiping operation could be increased in all working modes and scenarios, i.e. more web wipe length than required might be used, in order to reduce the likelihood of an overflow.

Such solutions may however be inefficient because they may cause the cartridge to be discarded before its elements are fully consumed, when operating in common working modes (and thus for a majority of users).

A controller of the printing system may monitor the total amount of printing fluid discharged into the container 6 from the moment a new cartridge is loaded in a printing system, and issue a warning before the total amount of printing fluid reaches the maximum capacity of the container.

However, this allows monitoring the life of a cartridge if it is not removed from the printer from the moment it is loaded (as a fresh/new cartridge) until it is discarded. In practice users may remove a first cartridge from a printer when it is not fully consumed, change it with a second one, and later load the first cartridge in the printer again; move a cartridge from one printer to another; and in general load any available and half-used cartridge in a printer. In these circumstances, it is impossible to monitor the total printing fluid discharged into the container 6, because the initial condition of the cartridge (i.e. the amount of printing fluid that is already in the container) is not known.

Figure 3:
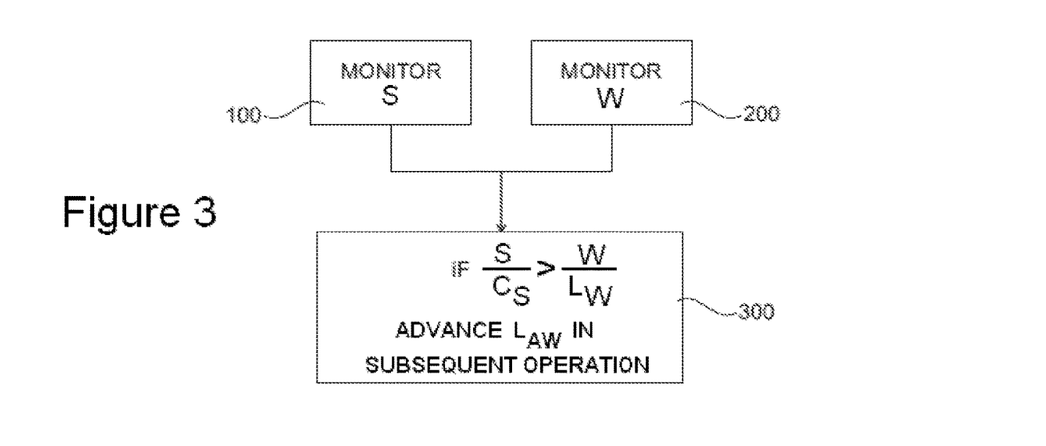
FIG. 3 is a flowchart illustrating examples of methods for managing a service cartridge in accordance with an implementation.

Examples of methods as disclosed herein of managing a service cartridge for an inkjet printhead are described in the following with reference to FIG. 3. The service cartridge comprises a printing fluid storage container 6, having a predetermined capacity $C_S$, for receiving and storing waste printing fluid discharged from the printhead, and a web 21 of wiping material (web wipe), having a predetermined total length $L_W$ and intended to be advanced a predetermined length $PL_{AW}$ for performing a wiping operation on the printhead. The web wipe that is advanced in the wiping operation is used to wipe the printhead and is therefore consumed.

In such examples, a method may comprise:
monitoring the amount S of printing fluid that is discharged into the container 6, as in block 100, and
monitoring the amount W of web wipe 21 that is advanced and therefore consumed, as in block 200;
determining the ratio $S/C_S$ between the amount of discharged printing fluid (S) and the capacity of the printing fluid storage container 6 ($C_S$), and
determining the ratio $W/L_W$ between the amount of consumed web wipe 21 (W) and the total length of the web wipe 21 ($L_W$);
if said ratio $S/C_S$ is higher than said ratio $W/L_W$, then causing that in a subsequent wiping operation the web wipe 21 is advanced a length $L_{AW}$ that is higher than the predetermined length $PL_{AW}$, as in block 300.

Examples of methods disclosed herein allow balancing the web wipe consumption with the use of the printing fluid storage container, such as to reduce the risk that waste printing fluid may fill the container 6 and overflow before all the web wipe 21 is consumed, in cases in which the use of the printer involves discharging a higher amount of printing fluid than usual. Furthermore, the life of the cartridge in normal cases or with normal working modes of the printing system is not reduced. This will be explained with more detail in the following.

In the most common printing or work modes, it is expected that the printing fluid storage container 6 is filled (so its capacity is fully consumed) approximately at the same rate the web wipe 21 is consumed. That is, at any given time during the life of the cartridge, the proportion of the container 6 already filled up with respect to its total capacity (ratio of the amount of discharged printing fluid to the capacity of the container 6), and the proportion of web wipe 21 already consumed with respect to the total available length (ratio of the amount of consumed web wipe to the total length of the web wipe), should be approximately the same.

If the ratio of the amount of discharged printing fluid to the capacity of the printing fluid storage container 6 remains equal to or lower than the ratio of the amount of consumed web wipe to the total length of the web wipe, that is, $$S/C_S \le W/L_W,$$

this means that the printing fluid is being discharged at the expected rate or at a lower rate, and as long as this condition does not change, there is no risk of fluid overflow.

On the contrary, if the ratio of the amount of discharged printing fluid to the capacity of the printing fluid storage container 6 becomes higher than the ratio of the amount of consumed web wipe to the total length of the web wipe, that is, $$S/C_S > W/L_W,$$

this means that the printing fluid is being discharged at a higher rate than expected. If this continues, the printing fluid storage container 6 may overflow before the web wipe is fully consumed, and therefore before a warning to replace the cartridge may be issued.

Monitoring the amount of discharged fluid and consumed web wipe during printing operations, and increasing the length of web wipe 21 that is advanced in at least some subsequent wiping operations, if the condition $$S/C_S > W/L_W$$

is met, has the effect that in this situation the rate at which the web wipe 21 is consumed is increased with respect to the rate at which the printing fluid storage container 6 fills up; the risk of printing fluid overflow from the container 6 before the cartridge is discarded may therefore be reduced.

Consequently, increased consumption of web wipe 21 may be limited to situations in which an unusually large amount of printing fluid is discharged, and avoided in common work modes employed by the majority of the users.

Examples of methods of managing a service cartridge may comprise performing overflow risk checks over time for determining if the printing fluid storage container 6 of the cartridge is in an overflow risk status or in a no overflow risk status. In such examples:
the overflow risk status of the printing fluid storage container 6 may be determined if in the overflow risk check it is found that the ratio between the discharged printing fluid and the capacity of the printing fluid storage container ($S/C_S$) is higher than the ratio between the web wipe consumed and the total length of the web wipe ($W/L_W$);
a no overflow risk status of the printing fluid storage container 6 may be determined if in the overflow risk check it is found that the ratio between the discharged printing fluid and the capacity of the printing fluid storage container ($S/C_S$) is not higher than the ratio between the web wipe consumed and the total length of the web wipe ($W/L_W$).

Figure 4:
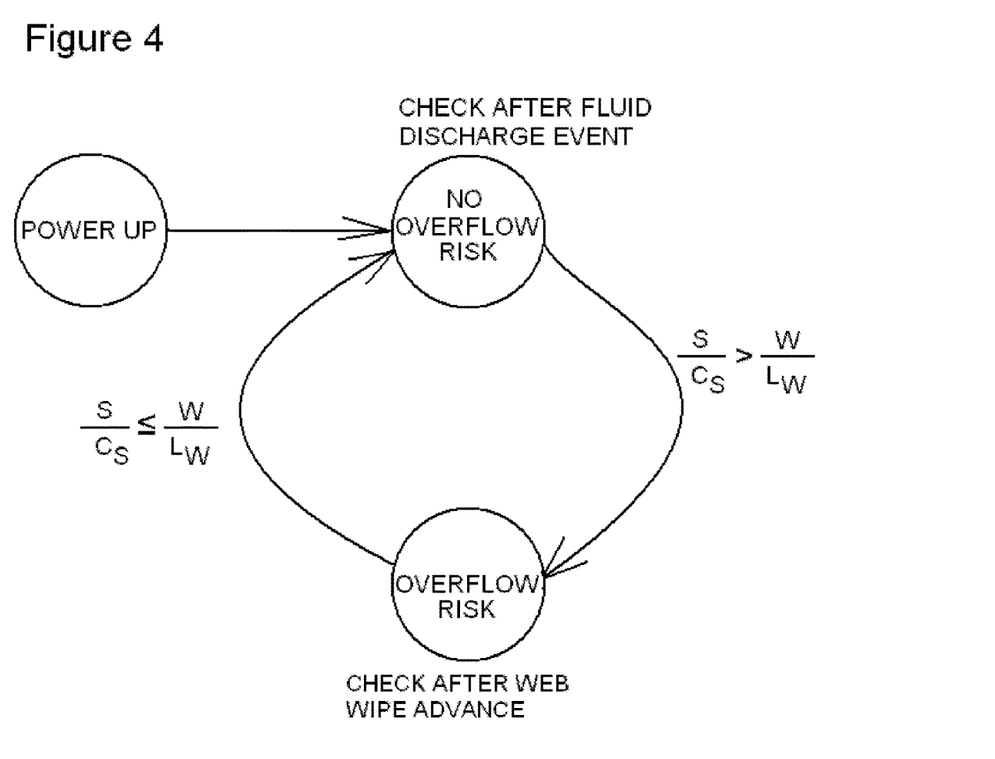
FIG. 4 is a states diagram associated with examples of methods as disclosed herein.

FIG. 4 graphically illustrates in a diagram how in examples of the method an overflow risk check may cause switching between one status and another, and also how a new overflow risk check may be triggered while the system is in each status.

As shown, when the system is in no overflow risk status, in some implementations a new overflow risk check may be triggered by or performed after at least some events of discharge of printing fluid into the container, such as an event in which printing fluid is spat from the printhead, as will be disclosed in more detail later. The status may change to overflow risk status, as already explained, if in the overflow risk check the condition $S/C_S > W/L_W$ is met.

On the other hand, when the system is in overflow risk status, a new overflow risk check may be triggered by or started after a web wipe advance to perform a wiping operation is detected, as will be disclosed in more detail later; the status may change to no overflow risk status, as already explained, if in the overflow risk check the condition $S/C_S \le W/L_W$ is met.

In some examples, when a no overflow risk status is determined, or while the status of the printing fluid storage container 6 is of no overflow risk, the service cartridge may be operated such as that the web wipe is advanced, in a subsequent wiping operation, a length that is equal to the predetermined length $PL_{AW}$.

When an overflow risk status is determined, or while the status of the printing fluid storage container 6 is of overflow risk, in some implementations the service cartridge may be operated such that the web wipe is advanced, in a subsequent wiping operation, a length $L_{AW}$ that is higher than the predetermined length $PL_{AW}$.

FIG. 4 also shows that on power up, that is, when the printing system in which the service cartridge is installed is switched on, it may be assumed that the waste printing fluid storage container 6 of the cartridge is in no overflow risk status.

Figure 5:
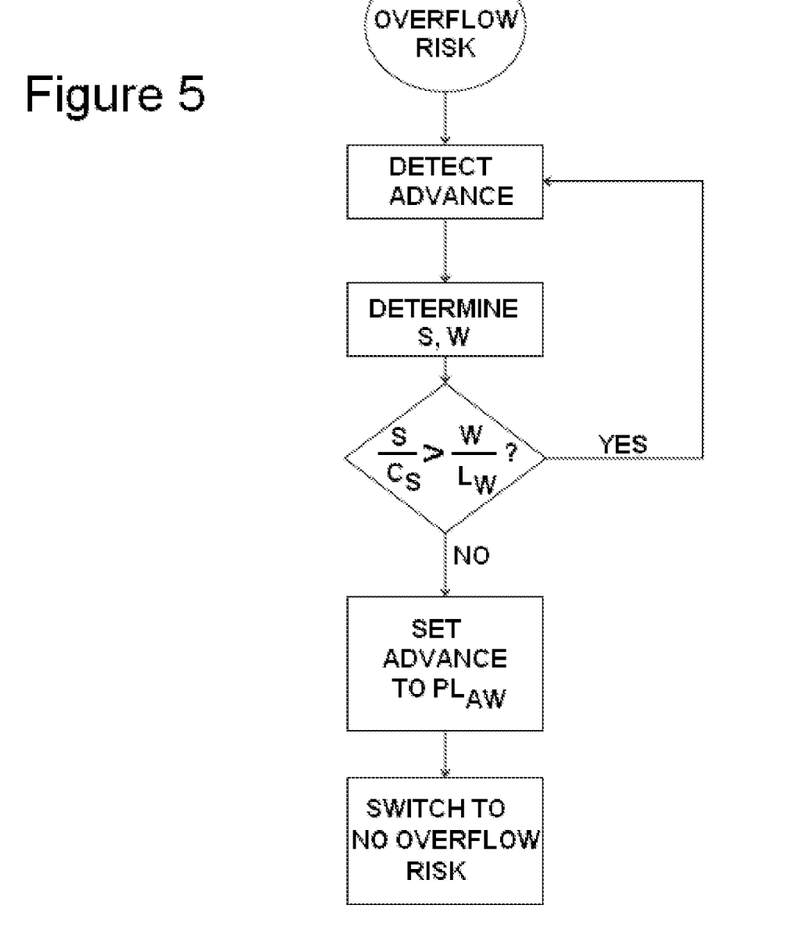
FIGS. 5 and 6 are flowcharts illustrating examples of methods for managing a service cartridge in accordance with an implementation.

FIG. 5 illustrates in a flowchart examples of a method with an overflow risk check that may be performed when the system is in overflow risk status.

In FIG. 5, a new overflow risk check may be triggered when an advance of the web wipe 21 to perform a wiping operation is detected. The detection of this event may be provided for example by a controller (not shown) that controls the wiping operation. In this detected advance of the web wipe 21, according to some implementations, the length advanced may be the length $L_{AW}$ that is higher than the predetermined $PL_{AW}$, because the system is in overflow risk status.

In some implementations, such as in FIG. 5, the overflow risk check may be performed after every advance of the web wipe 21 while the system is in overflow risk status. It may comprise, as shown in FIG. 5, determining the amount S of discharged printing fluid into the container 6, and the amount W of consumed web wipe 21, and with this data determining an overflow risk status if the ratio of the amount of discharged printing fluid to the capacity of the printing fluid storage container ($S/C_S$) is higher than the ratio of the web wipe consumed to the total length of the web wipe ($W/L_W$).

If this condition is met, the status is therefore not changed, and a new overflow risk check is performed after another web wipe advance is detected.

If, on the contrary, the condition is not met because the ratio of the amount of discharged printing fluid to the capacity of the printing fluid storage container 6 ($S/C_S$) is not higher than the ratio of the web wipe consumed to the total length of the web wipe 21 ($W/L_W$), then a no overflow risk status may be determined.

In such case, as shown in the flowchart of FIG. 5, the length of advance of the web wipe in the subsequent wiping operations may then be set to the predetermined length $PL_{AW}$, and the status may be switched to no overflow risk.

Figure 6:
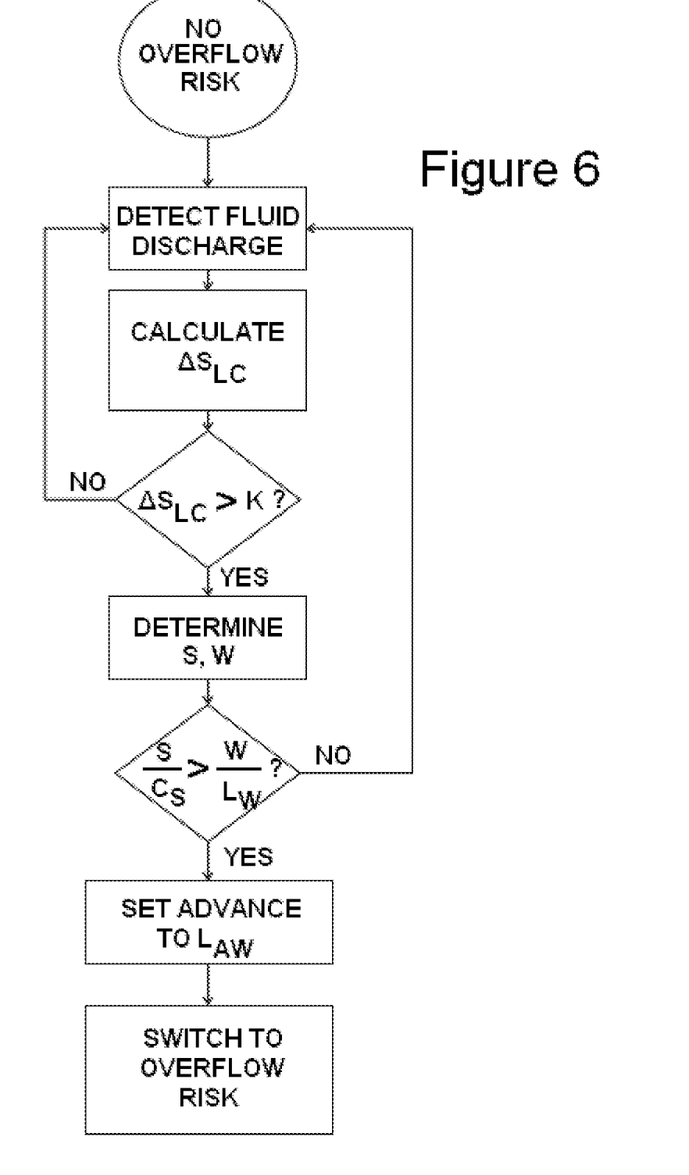

FIG. 6 illustrates in a flowchart an example of a method in accordance with an implementation. The method may comprise an overflow risk check that may be performed when the system is in no overflow risk status.

From such a no overflow risk status, in FIG. 6 a new overflow risk check may be triggered or started when it is detected that printing fluid is discharged into the container 6. In some implementations the detection of such an event may be provided for example by a controller (not shown) that controls the printhead spitting and/or priming operations.

The overflow risk check may be performed after at least some discharge events. However, if an overflow risk check is performed every time a few drops of printing fluid are discharged from a printhead, i.e. at every spitting and/or priming discharge event, this may give rise to a very high number of successive checks, with little difference between them.

In some examples, such a high number of checks may be avoided by introducing a degree of hysteresis in the process: it may be foreseen that a new overflow risk check is triggered or performed only after a certain predetermined amount of printing fluid has been discharged since the previous overflow risk check.

Thus, as shown in FIG. 6, the accumulated amount of printing fluid discharged since the previous overflow risk check $\Delta S_{LC}$ may be calculated, for example by recording and adding up the amount of each new discharge event. Verification may then be made of whether this accumulated amount $\Delta S_{LC}$ is higher than a predetermined amount or threshold K. If not, this process is repeated when the next printing fluid discharge event is detected, as shown in the flowchart of FIG. 6.

When the verification is positive, i.e. when an accumulated amount of fluid $\Delta S_{LC}$ higher than threshold K has been discharged since the previous overflow risk check, then a new overflow risk check is triggered, as shown in the flowchart of FIG. 6.

For example, a new check may be triggered if the accumulated amount of fluid discharged since the last check $\Delta S_{LC}$ is greater than K=1 cc.

In some implementations, an overflow risk check may therefore be performed after an event in which printing fluid is discharged into the container 6, if as a consequence of said event the amount of printing fluid discharged since the previous overflow risk check ($\Delta S_{LC}$) is higher than a predetermined amount K.

The overflow risk check may then comprise, as shown in FIG. 6, determining the amount S of discharged printing fluid into the container 6, and the amount W of consumed web wipe 21, and with this data determining an overflow risk status if the ratio of the amount of discharged printing fluid to the capacity of the printing fluid storage container 6 ($S/C_S$) is higher than the ratio of the consumed web wipe 21 to the total length of the web wipe 21 ($W/L_W$).

If this condition is met, the length of advance of the web wipe 21 in the subsequent wiping operations is set to a value $L_{AW}$ which is higher that than the predetermined length $PL_{AW}$, and the status of the printing fluid storage container 6 is switched to overflow risk.

If, on the contrary, the ratio of the amount of discharged printing fluid to capacity of the printing fluid storage container $S/C_S$ is not higher than the ratio of the web wipe consumed to the total length of the web wipe $W/L_W$, the status is not changed, and the process is resumed after a new discharge event is performed, as shown in FIG. 6.

In examples of the method such as those described above, the amount S of discharged printing fluid into the container 6 may be determined as the total amount of printing fluid that has been discharged into the printing fluid storage container 6 since a predetermined starting point or event.

Similarly, the amount W of consumed web wipe 21 may be determined as the total amount that has been consumed since said predetermined starting point or event, that is, the total amount of web wipe 21 that has been advanced to perform wiping operations, since the starting point or event.

In some examples, the predetermined starting point or event may be the later event, over time, between a printing system power on and a service cartridge replacement, that is, the most recent event at the time the method is being performed. If, for example, a printing system is switched off, the amount S of discharged printing fluid into the container 6 and the amount W of consumed web wipe 21 are set to zero, and their calculation starts again when the system is switched on.

If at any time a service cartridge is loaded in the system, the amount S of discharged printing fluid into the container 6 and the amount W of consumed web wipe 21 are also set to zero, and their calculation restarts from this point.

Therefore, even if service cartridges are e.g., changed from one printing system to another, and the system to which a cartridge is loaded has no previous information of the situation of the printing fluid storage container 6, various examples disclosed herein allow reducing the risk of overflow of the printing fluid from the container 6, because the container 6 receives fluid at a rate below the rate at which the web wipe 21 is consumed.

If a cartridge is managed with examples disclosed herein at all times, the risk of overflow may be avoided even if the cartridge is changed from one printing system to another, because during the operational life of the cartridge the container 6 always receives printing fluid at a rate below the rate at which the web wipe 21 is consumed. The web wipe 21 therefore becomes exhausted, and causes the cartridge to be replaced, before the container 6 may become full.

Some further particular implementations for managing a service cartridge for an inkjet printhead, which combine some details as described above, may comprise:

monitoring the amount S of printing fluid that has been discharged into the printing fluid storage container 6 since a predetermined starting point, and also the amount W of web wipe 21 that has been consumed since this predetermined starting point;

determining that the printing fluid storage container 6 is in an overflow risk status if the ratio $(S/C_S)$ of the amount of discharged printing fluid to the capacity of the printing fluid storage container is higher than the ratio $(W/L_W)$ of the amount of consumed web wipe 21 to the total length of the web wipe 21, and is in a no overflow risk status if this condition is not met;

in case it is determined that the system is in the overflow risk status, establishing that an advance length $L_{AW}$ higher than the predetermined advance length $PL_{AW}$ is to be employed in the subsequent wiping operation;

on the contrary, in case it is determined that the system is in the no overflow risk status, establishing that in the subsequent wiping operation the web wipe 21 has to be advanced the predetermined length $PL_{AW}$.

In some implementations, the starting point for monitoring the amount of discharged printing fluid S and consumed web wipe W may be the printing system power on, or it may be a service cartridge replacement if this is more recent than power on of the system.

In some implementations, the amount W of web wipe 21 that is consumed may be monitored or determined by detecting with a sensor (not shown) a consumption indicator (not shown), which may be printed or otherwise provided on said web wipe 21.

The amount S of printing fluid that is discharged into the container 6 may be monitored or determined, in some implementations, based on the spitting and priming operations ordered by a printhead controller (not shown).

According to examples, the method may be performed by a controller of a printing system comprising the printhead and the service cartridge.

The present disclosure is also related to a printing system which comprises a controller adapted to perform the method of claim 1 for managing a service cartridge for an inkjet printhead.

Although only a number of particular implementations and examples have been disclosed herein, further variants and modifications of the disclosed apparatus and methods are possible; other combinations of the features of implementations or examples described are also possible.

The invention claimed is:

1. A method for managing a service cartridge for a printhead, wherein the service cartridge comprises a printing fluid storage container for receiving printing fluid discharged from the printhead, and a web wipe for performing a wiping operation on the printhead, the method comprising:

in a first wiping operation, causing advancement of the web wipe by a first length;

monitoring an amount of discharged printing fluid into the printing fluid storage container; and in a second wiping operation after the first wiping operation, in response to the monitored amount of discharged printing fluid into the printing fluid storage container, causing advancement of the web wipe by a second length different from the first length.

2. The method of claim 1, further comprising:
monitoring an amount of consumed web wipe,
wherein causing advancement of the web wipe by the second length different from the first length in the second wiping operation is further in response to the monitored amount of consumed web wipe.

3. The method of claim 2, wherein the amount of consumed web wipe is monitored based on detecting a consumption indicator provided on the web wipe.

4. The method of claim 1, wherein causing advancement of the web wipe by the second length different from the first length in the second wiping operation is in response to determining the monitored amount of discharged printing fluid into the printing fluid storage container deviating from a target level.

5. The method of claim 4, further comprising:
monitoring an amount of consumed web wipe,
wherein the monitored amount of discharged printing fluid into the printing fluid storage container deviates from the target level if a proportion of the amount of discharged printing fluid into the printing fluid storage container to a capacity of the printing fluid storage container deviates from a proportion of the amount of consumed web wipe to a total length of the web wipe.

6. The method of claim 5, wherein the monitored amount of discharged printing fluid into the printing fluid storage container deviates from the target level if the proportion of the amount of discharged printing fluid into the printing fluid storage container to the capacity of the printing fluid storage container is greater than the proportion of the amount of consumed web wipe to the total length of the web wipe.

7. The method of claim 5, further comprising performing overflow risk checks over time for determining if the printing fluid storage container of the service cartridge is in an overflow risk status or in a no overflow risk status, wherein the overflow risk status of the printing fluid storage container is determined if the proportion of the amount of discharged printing fluid to the capacity of the printing fluid storage container is higher than the proportion of the amount of consumed web wipe to the total length of the web wipe, and the no overflow risk status of the printing fluid storage container is determined if the proportion of the amount of discharged printing fluid to the capacity of the printing fluid storage container is not higher than the proportion of the amount of consumed web wipe to the total length of the web wipe.

8. The method of claim 7, further comprising:
in response to determining the no overflow risk status, causing advancement of the web wipe, in a subsequent wiping operation, by a length equal to a predetermined length.

9. The method of claim 8, further comprising:
in response to determining the overflow risk status, causing advancement of the web wipe, in a further wiping operation, by a length that is greater than the predetermined length.

10. The method of claim 7, further comprising:
in response to determining the overflow risk status, triggering a new overflow risk check responsive to a web wipe advance in a wiping operation.

11. The method of claim 10, further comprising:
in response to determining the no overflow risk status, triggering a new overflow risk check responsive to an event of discharge of printing fluid into the printing fluid storage container.

12. The method of claim 1, wherein the amount of discharged printing fluid into the printing fluid storage container is monitored based on spitting and priming operations requested by a printhead controller.

13. The method of claim 1, wherein the method is performed by a controller of a printing system comprising the printhead and the service cartridge.

14. A printing system comprising:
a printhead;
a service cartridge comprising a printing fluid storage container for receiving printing fluid discharged from the printhead, and a web wipe for performing a wiping operation on the printhead; and
a controller to:
in a first wiping operation, cause advancement of the web wipe by a first length;
monitor an amount of discharged printing fluid into the printing fluid storage container; and
in a second wiping operation after the first wiping operation, in response to the monitored amount of discharged printing fluid into the printing fluid storage container, cause advancement of the web wipe by a second length different from the first length.

15. The printing system of claim 14, wherein the controller is to further:
monitor an amount of consumed web wipe,
wherein causing advancement of the web wipe by the second length different from the first length in the second wiping operation is further in response to the monitored amount of consumed web wipe.

16. The printing system of claim 14, wherein causing advancement of the web wipe by the second length different from the first length in the second wiping operation is in response to determining the monitored amount of discharged printing fluid into the printing fluid storage container deviating from a target level.

17. The printing system of claim 16, wherein the controller is to further:
monitor an amount of consumed web wipe,
wherein the monitored amount of discharged printing fluid into the printing fluid storage container deviates from the target level if a proportion of the amount of discharged printing fluid into the printing fluid storage container to a capacity of the printing fluid storage container deviates from a proportion of the amount of consumed web wipe to a total length of the web wipe.

18. The printing system of claim 17, wherein the monitored amount of discharged printing fluid into the printing fluid storage container deviates from the target level if the proportion of the amount of discharged printing fluid into the printing fluid storage container to the capacity of the printing fluid storage container is greater than the proportion of the amount of consumed web wipe to the total length of the web wipe.

19. A system comprising:
a fluid ejection device;
a service cartridge comprising a fluid storage container for receiving fluid discharged from the printhead, and a web wipe for performing a wiping operation on the fluid ejection device; and
a controller to:
in a first wiping operation, cause advancement of the web wipe by a first length;
monitor an amount of discharged fluid into the fluid storage container; and
in a second wiping operation after the first wiping operation, in response to the monitored amount of discharged fluid into the fluid storage container, cause advancement of the web wipe by a second length different from the first length.

20. The printing system of claim 19, wherein the controller is to further:
monitor an amount of consumed web wipe,
wherein causing advancement of the web wipe by the second length different from the first length in the second wiping operation is in response to determining that a proportion of the amount of discharged fluid into the fluid storage container to a capacity of the fluid storage container deviates from a proportion of the amount of consumed web wipe to a total length of the web wipe.

* * * * *